(12) United States Patent
Plasberg et al.

(10) Patent No.: US 7,995,836 B2
(45) Date of Patent: Aug. 9, 2011

(54) OPTOELECTRONIC MULTIPLANE SENSOR AND METHOD FOR MONITORING OBJECTS

(75) Inventors: Georg Plasberg, Bahlingen (DE); Martin Wuestefeld, Sexau (DE)

(73) Assignee: Sick AG, Waldkirch (DE)

(*) Notice: Subject to any disclaimer, the term of this patent is extended or adjusted under 35 U.S.C. 154(b) by 922 days.

(21) Appl. No.: 11/998,487

(22) Filed: Nov. 29, 2007

(65) Prior Publication Data
US 2008/0285842 A1 Nov. 20, 2008

(30) Foreign Application Priority Data
Dec. 2, 2006 (EP) .................................. 06024979

(51) Int. Cl.
*G06K 9/00* (2006.01)

(52) U.S. Cl. ................. 382/154; 250/559.44; 701/45

(58) Field of Classification Search ............... 382/154
See application file for complete search history.

(56) References Cited

U.S. PATENT DOCUMENTS

| | | | | |
|---|---|---|---|---|
| 4,912,496 | A * | 3/1990 | Tamada et al. | 396/96 |
| 5,004,997 | A * | 4/1991 | Shisgal et al. | 340/436 |
| 6,441,363 | B1 * | 8/2002 | Cook et al. | 250/221 |
| 2002/0116106 | A1 * | 8/2002 | Breed et al. | 701/45 |
| 2004/0066500 | A1 | 4/2004 | Gokturk et al. | |
| 2006/0208169 | A1 * | 9/2006 | Breed et al. | 250/221 |

FOREIGN PATENT DOCUMENTS

| | | |
|---|---|---|
| CH | 641 583 A5 | 2/1984 |
| DE | 198 15 149 A1 | 10/1999 |
| DE | 199 19 925 A1 | 11/2000 |
| DE | 101 10 420 A1 | 9/2002 |
| DE | 102 29 408 A1 | 1/2004 |
| DE | 10 2005 050 824 A1 | 5/2006 |
| DE | 10 2005 050824 A1 | 5/2006 |
| DE | 10 2005 003 827 A1 | 7/2006 |
| DE | 20 2006 012 351 U1 | 10/2006 |
| EP | 0 913 707 A1 | 5/1999 |
| EP | 1 174 733 A2 | 1/2002 |
| EP | 1 548 351 A2 | 6/2005 |
| EP | 1 442 319 B1 | 8/2006 |
| EP | 1 892 456 A1 | 2/2008 |
| WO | WO 2006/126591 A1 | 11/2006 |

OTHER PUBLICATIONS

Sickinsight Feb. 2006, "Mehr Sicherheit beim Schwerverkehr mit LMS-Lasermesssystemen," p. 24 (Nov. 28, 2006).

* cited by examiner

*Primary Examiner* — Vu Le
*Assistant Examiner* — Michael Vanchy, Jr.
(74) *Attorney, Agent, or Firm* — Kilpatrick Townsend & Stockton LLP

(57) ABSTRACT

An optoelectronic sensor and method for detecting an object in a three-dimensional monitored region uses a plurality of video sensors. Each sensor has a multiplicity of light-receiving elements that are configured to take a pixel picture of the monitored space, and a control unit identifies an object in the monitored space from video data of the pixel picture. Each video sensor has at least one pixel line that is formed by light-receiving elements. The video sensors are spaced from each other so that each sensor monitors an associated plane of the monitored space.

31 Claims, 8 Drawing Sheets

OPTOELECTRONIC MULTIPLANE SENSOR AND METHOD FOR MONITORING OBJECTS

CROSS-REFERENCES TO RELATED APPLICATIONS

This application claims the priority of European Patent Application No. 06024979.4, filed Dec. 2, 2006, the disclosure of which is incorporated herein by reference.

BACKGROUND OF THE INVENTION

The present invention concerns an optoelectronic sensor and the method for monitoring a three-dimensional space along a plurality of planes.

The automated monitoring of a three-dimensional space has many applications. For example, it may be used to prevent theft, in the automation industry, as well as for security purposes. In connection with the operation and/or securing of potentially dangerous machines, it is especially necessary to detect the presence of an object or a body part, often including the relative position thereof in a three-dimensional space.

The prior art includes a variety of proposals for monitoring three-dimensional spaces. However, each of the prior art "solutions" has shortcomings which limit its usefulness.

For example, it is known to monitor a space with a camera and to compare the picture taken by the camera with a reference picture in order to detect changes in the three-dimensional space, such as the entry of an object into the space, and to react accordingly. A further development of such technology is to take three-dimensional pictures. This requires a double camera and a stereoscopic evaluation thereof, as is disclosed for example in U.S. Pat. No. 6,297,844 B1.

In addition to relatively extensive calculations that must be performed in connection with such a stereoscopic method, this approach has the further disadvantage that all monitoring originates from a single point. This results in a pyramid or cone-like monitored region or measurement field. A rectangularly-shaped space within such a monitored region creates significant evaluation problems. In addition, objects, such as pallets, measuring heads and the like, can be in or can extend into the monitored region. The sight shadow created by such objects creates a non-monitored space.

Another approach is disclosed in DE 197 57 848 C2. It employs a laser scanner to direct its light via a system of mirrors and apertures along several planes. One particular embodiment consists of several scanning lasers arranged next to each other and so that a mirror can be moved to generate a plurality of parallel, spaced-apart scanning planes. A disadvantage of this approach is that it requires mechanical components, such as the rotating scanning laser, which are costly and subject to failures. In addition, the planes must be closely adjacent to each other because the several scanning lasers would otherwise be heavy and the resulting inertia would make rapid rotational movements difficult or impossible. Monitoring a space which extends beyond the immediate vicinity of a plane is therefore not possible with this approach.

It is further known to place a type of cage defined by light grids or scanners about a machine that is to be secured. In such a case, light columns are placed at the four corners of a square or rectangular base surface so that its side surfaces, for example, can be illuminated. An obvious disadvantage of this configuration is that several light columns are needed. They interfere with normal operations around the protected machine and create relatively high costs.

Finally, a number of approaches monitor a single plane. This can be a light grid, a laser scanner or a triangulation sensor with a camera element. It is further feasible to include a distance-measuring picture or video sensor. Of course, such sensors can only monitor a surface and not a three-dimensional space.

BRIEF SUMMARY OF THE INVENTION

It is therefore an object of the present invention to provide a reliable sensor for monitoring three-dimensional spaces in a manner so that its monitoring functioning is substantially unaffected by objects in the space or that the monitored space is not disturbed by the sensor.

Accordingly, the present invention provides a sensor and a method for identifying objects in a three-dimensional space with a plurality of video sensors which have a multiplicity of light-receiving elements configured to generate a pixel picture of the monitored region. A control unit identifies objects in the monitored region from video data of the pixel picture, and each video sensor includes at least one pixel line formed by light-receiving elements. The video sensors are spaced apart from each other so that each sensor monitors an associated plane of the monitored space.

The present invention has the advantage that the accuracy with which the space is monitored can be adjusted by varying the number of planes which are monitored so that the presence of an object in the space does not create a monitoring shadow that would prevent monitoring parts of the space. This permits maintaining the functionality of the sensors, even when permitted objects are present in the monitored space. The sensor is compact and the space is obstacle-free except for the presence of a number of light grids or scanners along boundary areas of the space. The sensor is relatively inexpensive to produce and makes use of a significantly simpler and more reliable evaluation process as compared to prior art space monitoring systems.

The present invention further extends the usefulness of known, relatively inexpensive surface sensors. By merely increasing the number and arrangement of such sensors, a three-dimensional space can be monitored.

The video sensors are preferably arranged so that the respective planes do not overlap and are substantially parallel to each other or diverge in a fan-like manner from the sensors in an outward direction. When the monitored space forms a cube-like or rectangularly-shaped space, it is relatively easy to adjust the parallel planes which are monitored. Alternatively, by arranging the sensors so that their respective planes diverge in a fan-like manner, the accuracy with which space is monitored increases as the distance to the monitor decreases.

In a more preferred embodiment of the invention, the picture sensors are arranged so that any two planes are spaced apart from each other by a predetermined amount over at least a portion of the monitored region. In this manner, the desired object resolution by the sensor can be adjusted according to need, and a balance can be struck between the cost of a larger number of sensors and the desired monitoring accuracy.

Still further preferred is that the predetermined distance between the planes is 7-10 mm for the detection of fingers, 10-20 mm for the detection of extremities and 30-80 mm for the detection of lower extremities of a human body. These are typical distances for fulfilling certain security requirements, and they can be varied according to the requirements of the particular application.

It can be advantageous to arrange the picture sensors along a straight or a curved line. This permits use of simple, straight sensors in one case and positioning the sensors to adapt their arrangement to the geometry of the mounting location and/or the geometry of the monitored space in the other case.

Each sensor preferably has an associated light source, in particular a laser or an LED, because a sufficient illumination of the space by external light is often not available. In addition, a light source associated with the sensor has known properties which at least facilitate the evaluation and in many instances make an evaluation possible in the first place.

Preferably, the light source emits visible, infrared or ultraviolet light. Depending on the application, it can be advantageous that the sensor illumination is visible or invisible.

The picture sensors preferably generate a distance-resolving pixel picture. In this manner, it is not only known whether an object is present in the plane, but also where it is located. This permits a much more accurate determination whether a given object in the monitored region is permitted to be there or not.

The light source can be configured to direct a structured light pattern or an illumination line along the plane, for example by placing a diffractive optical element into the path from the light source, so that the video sensor can calculate distances by triangulation. Such a light source makes it easier to reliably generate information from the picture by triangulation.

The light-receiving elements of the video sensors can alternatively determine distances on the basis of the elapsed light travel time. This is another known and reliable method for determining distances. Thus, known video sensors can be used by the present invention.

Alternatively, the light sources emit intensity-modulated light, and the light-receiving elements determine the phase shift in the received light. This is another robust and known manner for determining light travel time. In such a case, a conventional video sensor uses a photon mixing detector (PMD) with "Ladungsschaukel" (charging swing) for each pixel. With its charge proportion, the phase of the modulated light can be determined and its running time can be calculated.

The sensor is preferably constructed for monitoring a protected zone which constitutes a portion of the monitored region. The control for each plane provides angle-dependent protected zone distance conditions, and an object is recognized as an unauthorized entry into the protected zone when the distance conditions are met. The distance conditions make it possible to generate a multitude of different geometries, which can be adapted for any given application, to define in which portion or portions of the monitored region objects are not permitted. The protected region can therefore be configured according to need and is not solely dependent on the arrangement of the video sensor and outer limits.

It is preferred that the sensor monitors a warning zone which constitutes a portion of the monitored region and surrounds the protected zone. The control for each plane provides an angle-dependent warning zone based on distance conditions, and a detected object is recognized as being in the warning zone when the warning zone distance conditions are met. The configuration possibilities for the warning are the same as for the protected zone. An object incursion into the warning zone generates a milder reaction, such as a warning signal, than an incursion into the protected zone. In one application for securing a dangerous region, the control is preferably configured to generate the warning signal when the warning zone is breached. For example, when the object enters the warning zone, a warning signal is emitted, while entry of the object into the protected zone leads to an immediate deactivation of the protected machine.

The distance conditions for the protected zone and for the warning zone preferably use the same angular range for several or all of the planes. In such a case, the protected zone and the warning zone need not be configured separately for each plane and can be copied from one plane to the next. This facilitates the evaluation and installation. In addition, the boundaries of the object(s) in the monitored region, which may affect several planes, can be taken account of in a simple manner.

The protected zone and/or the warning zone preferably have the shape of a cube, a rectangularly-shaped (box-like) space, a partial cone, a partial cylinder or a cage that has a cubed shape, a rectangular box shape, a partial cone shape or a partial cylinder shape. Such geometries are readily configured with the help of the earlier discussed distance conditions. Alternatively, a portion of the geometry can be provided by outer boundaries, such as a common edge.

Each video sensor preferably has a sight angle of 90°. This is technically readily accomplished and is particularly well-suited in the case of a cube or a rectangular box-shaped monitored region. Alternatively, panorama optics is associated with each video sensor so that the sensor has a sight angle of 360°. This permits use of the video sensor for monitoring much larger monitored regions.

In another embodiment of the invention, each video sensor has an additional associated sensor which is arranged so that the sight angles of both sensors are additive. A panorama optics having any desired sight angle can therewith be provided at relatively low cost.

Each video sensor preferably has a CCD chip or a CMOS chip with several lines. To simplify adjustment, the line or lines which monitor the associated planes can be selected during a learning phase. The cost of producing a video sensor with several lines is negligibly higher than the cost of a sensor with only one line. The selection of the correct line during the initial learning phase makes adjustments user-friendly.

It is preferred that the light-receiving elements of each video sensor have a common optics. This enhances the available light and makes it possible to image the monitored region on the video sensor.

Alternatively, a micro optics is associated with a group of light-receiving elements of each video sensor. The video sensor and the micro optics can then form a common module. Micro optics transmit somewhat less light to the light-receiving element than the common optics, but provide a significantly more compact and less costly alternative.

In another embodiment, several video sensors or several common modules are arranged on a common support carrier, which lowers the production cost of video sensors.

The control, video sensors and light sources preferably have a common electric current supply. This simplifies the sensor and its connection to the power source and renders the entire assembly more compact.

A common control can further be provided for several or all of the video sensors. This again makes the units more compact and saves costs.

The common control is preferably configured to capture the object with a plurality of video sensors in different planes, to combine them into a geometric object classification, and to identify only certain classes of objects as dangerous objects. There are objects, such as pallets, instruments and working implements, which are supposed to be in the monitored region and which are detected in a plurality of planes. The common control identifies such objects as being permitted and does not react when they are present.

In a further embodiment of the invention, the control is configured to combine the capture of an objection by video sensors in a plurality of planes in order to identify the position and/or orientation of the object in the planes. Changes in the position and/or orientation of the object can be recognized as movement by the object. Certain positions/orientations of the object or its movement can then be identified as constituting a danger. For example, a robot positioned close to operating personnel may be desirable or necessary and constitutes no danger. However, the robot can become dangerous when it approaches the operating personnel at too high a speed. Only in the later instance will the sensor react. Similarly, another source of danger at a certain distance from the operating personnel might be normal and danger-free. However, when the distance of the source of danger falls below a predetermined limit, it can be identified as constituting a danger.

In another embodiment of the invention, cooperative boundaries for the monitored region are provided, and the control is configured to use a picture or distance thereof for a functional test of the video sensor by comparing it with a reference picture or a reference distance. When the video sensor indicates an empty monitored region, no distinction can be made between this case and a malfunctioning of the video sensor. The functionality of the video sensor can be tested independently of the scenery in the monitored region with the help of the just-described cooperative boundaries.

In a particular embodiment of the invention, the sensor secures a dangerous zone by having the control emit a warning signal or a shut-down signal for a machine in the monitored region when the protected zone has been breached, or when a danger is otherwise identified. The control thereby recognizes the security requirements and, depending on the encountered situation, will emit a warning signal or will directly deactivate a dangerous machine.

In a further embodiment, the sensor is mobile and mounted on a vehicle or on a robot. As an alternative to a static mounting of the sensors, the presence of obstacles or persons in the path of the vehicle or robot can be identified.

In a further embodiment of the invention, the sensor is used for measuring or surveying an object in the monitored region. With the number of and the distance between the planes past which the object extends, its height can be determined. Similarly, with the distances within a plane of at least contrasting objects having known dimensions, their shape and other exterior configurations can be determined.

When desired, the method of the present invention can be further modified in conformity with the above-discussed attributes of the sensors and provides advantages similar to those mentioned previously.

DETAILED DESCRIPTION OF THE PREFERRED EMBODIMENTS

Figure 1:
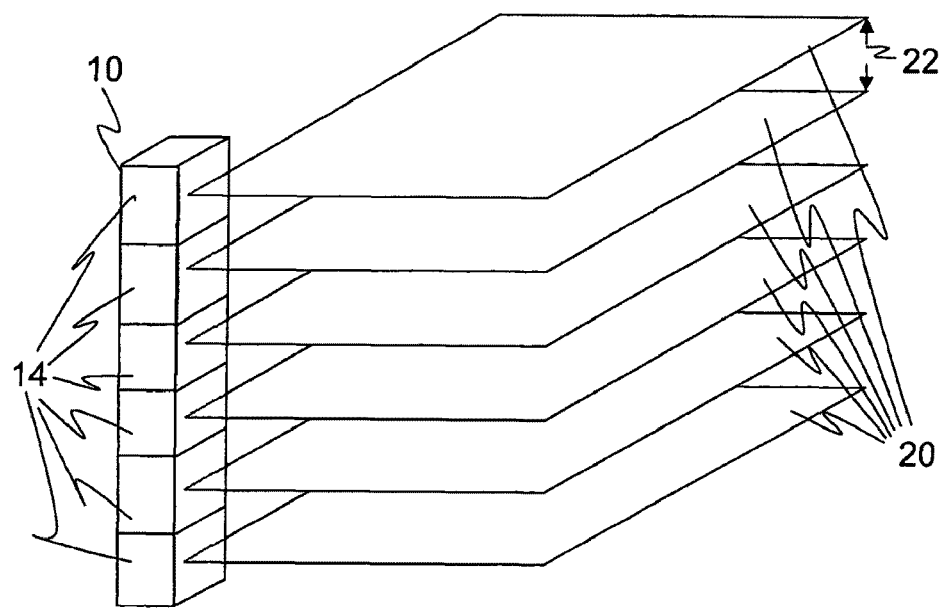
FIG. 1 three-dimensionally illustrates one embodiment of a multi-plane sensor made in accordance with the invention.

FIG. 1 illustrates the basic construction of one embodiment of a multi-plane sensor 10 constructed in accordance with the present invention. A three-dimensional space 12 is monitored with multi-plane sensor 10 by arranging a multitude of monitored planes 20 in space 12. Each of these planes is monitored by a known surface or plane sensor 14. Principally, a plurality of two planes is sufficient; however, a greater number of planes increases the accuracy with which an object can be detected. In the illustrated embodiment of the invention, space 12 is a cube or the rectangularly-shaped box and the planes are regularly spaced from and parallel to each other. They therefore function as a spatial light grid.

A spacing 22 between planes 20 is selected depending on the size of the object that is to be detected. The distance 22 can be about 7-10 mm for the detection of fingers, 10-20 mm for a detection of extremities, or 30-80 mm for the detection of lower extremities of a human body. Other distances for the detection of different objects can, of course, be selected. A maximum size of spacing 22 for use in safety technology applications is dependent on the applicable safety classification. It is also possible that the distance 22 is not the same between all planes. For example, at a height where an operator normally uses his hands requires a significantly smaller spacing 22 than in the vicinity of the ground where only the feet of operators are likely to be detected. Spacing 22 can be reduced in the vicinity of a more dangerous object or where danger might otherwise arise.

Figure 2:
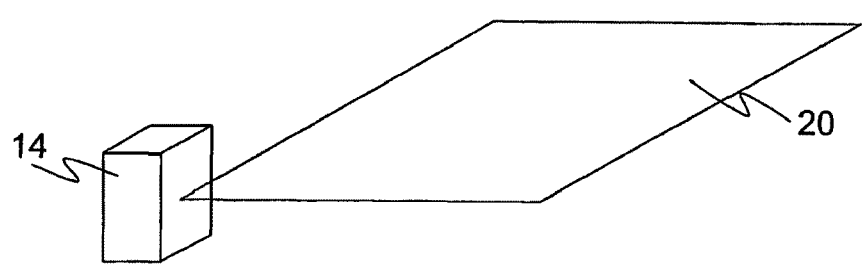
FIG. 2 is a three-dimensional schematic which illustrates a single-plane element of the multi-plane sensor.

FIG. 2 shows a single planar sensor 14 and the plane it monitors. A multi-plane sensor 10 includes two or more such planar sensors, one for each plane. Each surface sensor 14 monitors an associated plane 20 where it defines a protected zone to detect penetration of the plane by the object or the position of an object in the plane. Such planar sensors are known and relatively cost-effective to produce.

Figure 3:
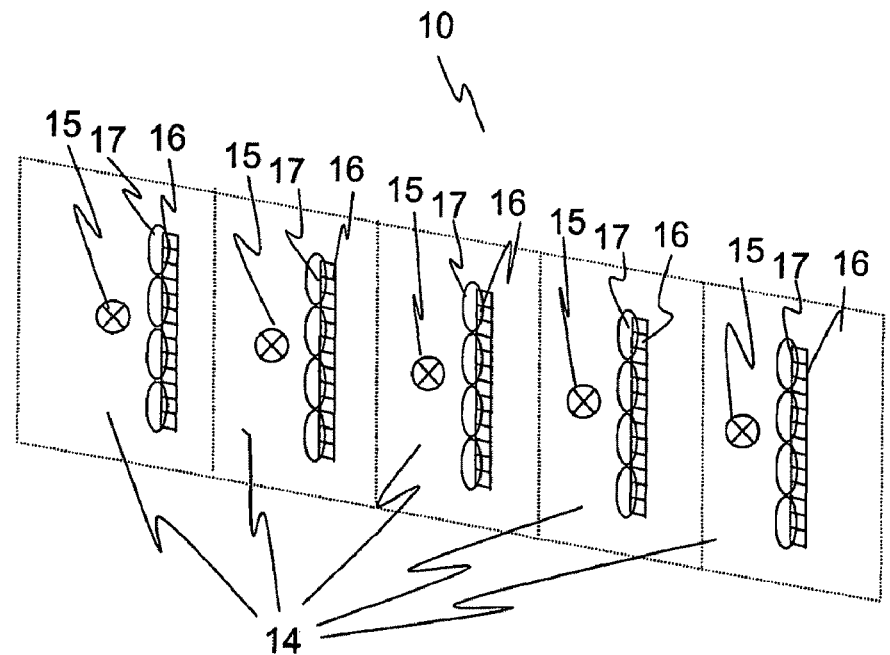
FIG. 3 is an interior view of the multi-plane sensor taken from the front at an inclined angle.

FIG. 3 illustrates the interior construction of a multi-plane sensor 10 as seen from the front. Each surface sensor 14 of a multi-plane sensor includes a light source 15 and a picture or video sensor 16 with associated optics 17. Light source 15 can be a laser or an LED. To completely illuminate plane 20, a row of LEDs or a laser stack can be used. Instead, or in addition, light from the source can be spread out with a diffractive optical element. According to the particular application, light source 15 provides visible, ultraviolet light or infrared light. Visible light has the advantage that operating personnel can identify the monitored plane 20. On the other hand, infrared and ultraviolet light do not interfere with the operating personnel at night that work in monitored zone 12.

Video sensor 16 is a CCD chip or a CMOS chip which lies linearly in plane 20. When the sight angle of surface sensor 14 is, for example, 90°, this line preferably is at an angle of 45°, which is the generally preferred one-half of the sight angle. Video sensor 16 has a multiplicity of light-receiving elements that are arranged next to each other so that they can generate a line-shaped pixel picture of plane 20.

Video sensor 16 can also be a double video sensor for stereoscopically monitoring plane 20. For example, two line-shaped video sensors can be arranged next to each other in plane 20 so that they monitor the space from offset angles and they together form video sensor 16. The stereoscopic picture of plane 20 taken by the two video sensors can be used as such as a distance-resolving picture. Further alternative methods for determining distances are described below.

Figure 4:
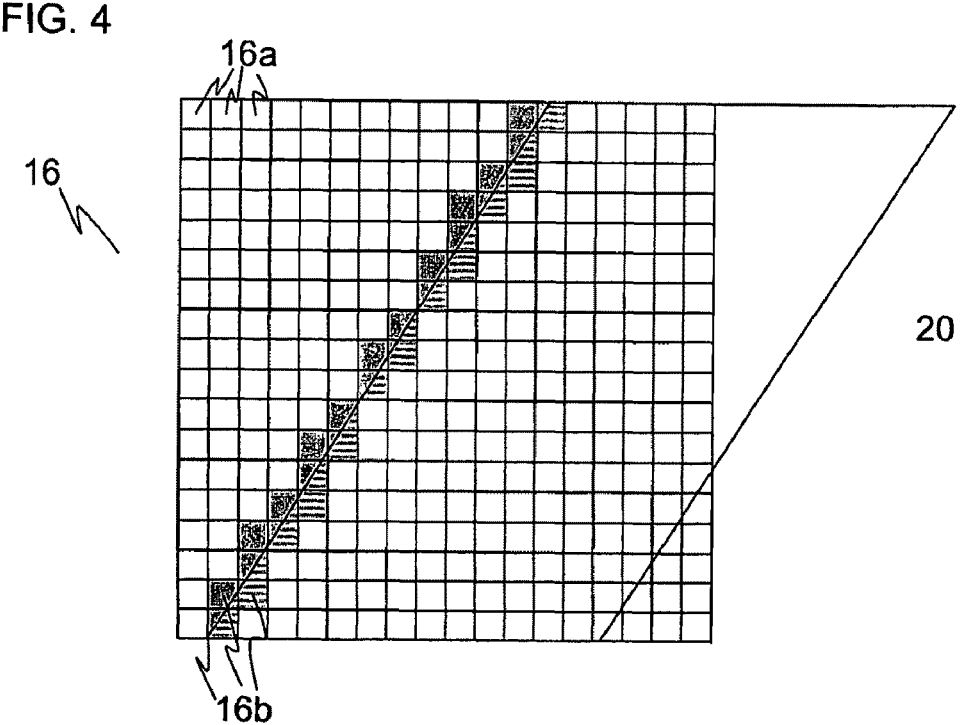
FIG. 4 is a diagram that illustrates the learning phase for the light-receiving elements arranged along the light-receiving line of a video sensor and illustrates the receiving optics for a video sensor with a common lens.

Video sensor 16 can be directly produced as a line-type, preferably integrated chip. FIG. 4 shows an alternative in which video sensor 16 is a matrix-shaped chip. Such a matrix-shaped video sensor 16 can monitor a single plane 20, as well as a disk of finite thickness of monitored region 12. It is also possible to activate only a single line of matrix-shaped video sensor 16, in which event the remaining light-receiving element 16a or pixels remain unused. Since production costs for a line-shaped and a matrix-shaped chip are virtually identical, the use of a video sensor 16 with several lines instead of only a single line increases costs only negligibly.

To select active light-receiving element 16b, video sensor 16 is illuminated in its receiving plane 20 to determine which light-receiving element 16b lies in plane 20. As shown in FIG. 4, this line can extend quite irregularly over the matrix of video sensor 16, which makes it more difficult to work with. To overcome this, an adjustment can be made to at least assure that video sensor 16 is at a right angle. This is readily accomplished since video sensors 16 are appropriately aligned in multi-plane sensor 10, and a right-angle orientation relative to plane 20 can be assured with a regularly dimensioned housing for the multi-plane sensor. Following such a rough adjustment, the active light-receiving elements lie in a line or a gap of the matrix-like chips. It is also possible to select a plurality of adjacent lines for monitoring plane 20 instead of only a single line.

The light-receiving elements of video sensor 16 can also determine colors, gray scale values and/or distance-related signals. A method for determining distances is described below with reference to FIGS. 6 and 7. For distance determinations, the needed evaluation can take the form of an ASIC that is directly associated with the individual light-receiving elements ("intelligent pixel").

Figure 5A:
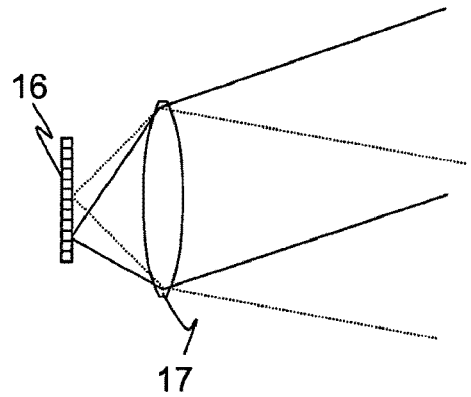
FIG. 5a shows the receiving optics of a video sensor with a common optics.

FIG. 5a shows a video sensor 16 which has an associated lens as optics 17. The solid and broken lines respectively show on which light-receiving path or pixel light is being received. The lens has a relatively large capture range and, as a result, directs a relatively large amount of light to the pixel on which it forms images. In other words, a common lens 17 provides a good energy balance, light intensity and resolution.

Figure 5B:
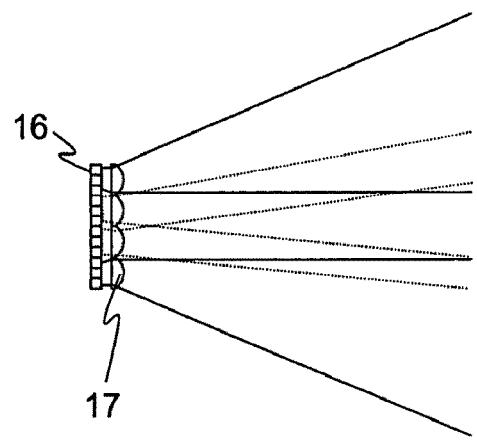
FIG. 5b illustrates the receiving optics for a video sensor with micro optics.

FIG. 5b illustrates a video sensor 16 with associated micro optics 17 ("facet eye"). Here too, the solid and dotted lines show the respective capture ranges. Each lens of micro optics 17 has a lesser light output than a common lens, so that overall the illumination provided by the former is somewhat less. An advantage of micro optics 17 is that it can be located closer to the video sensor 16 and that it is relatively small in size. This results in a significantly more compact construction.

Optics 17 can be made of glass. It can be molded from a plastic material, in which event it can be combined with the associated video sensor 16 to form a module. The modules, made up of video sensors 16 and associate optics 17, as well as light source 15, can be mounted on a common carrier or on a pallet. By further providing a common current supply for all modules and installing the pallet or other support in an appropriate housing, an entire multi-plane sensor 10 can be formed.

A common control unit is preferably associated with modules 16, 17. The common control can combine objects captured by several video sensors 16 in different planes 20 and in this manner classify the objects as dangerous or not dangerous ("intelligent muting"). For example, an object that ordinarily traverses planes 20 in a known manner, such as a moving pallet, can be classified not dangerous. In a similar manner, the position of objects relative to each other can be evaluated. For example, a robot at a known distance from a person at his or her normal working position can be identified as not dangerous. However, if this distance decreases, the robot can be classified as dangerous ("cooperative working position").

For some applications, a colored or gray-value picture can be sufficient. When, in addition to gray values, distances are also measured, the number of possible applications multiplies. For such embodiments of the present invention, video sensor 16 can be constructed so that distances are measured on the basis of the elapsed light travel time.

Figure 6:
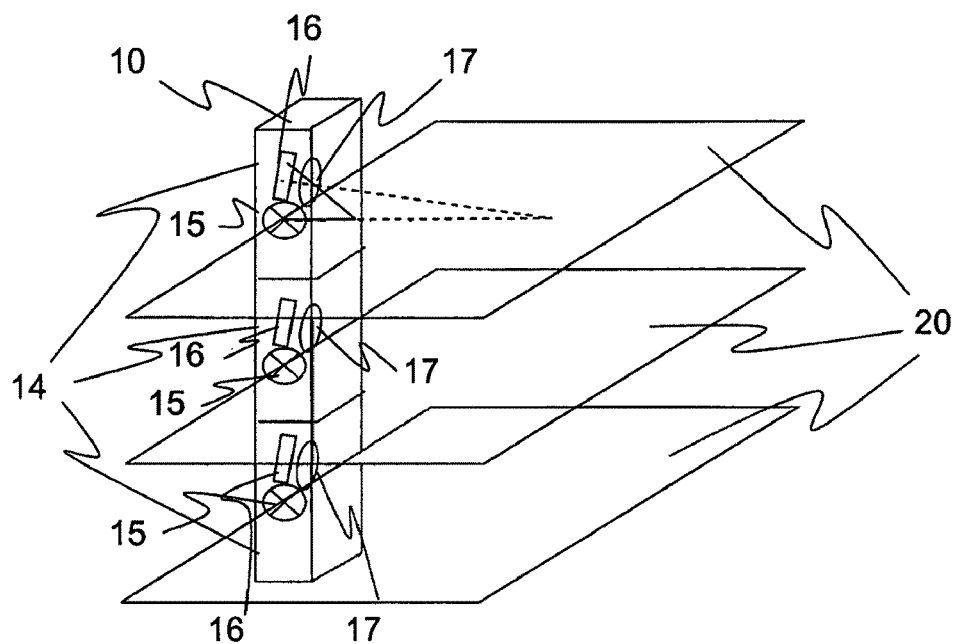
FIG. 6 three-dimensionally illustrates a multi-plane sensor that employs triangulation for determining distances.

FIG. 6 illustrates the construction of a multi-plane sensor 10 with triangulating surface sensors 14. For triangulation, plane 20 that is to be observed is illuminated by a light source 15 with a structured illumination pattern or a simple illumination line. This can be accomplished, for example, with the help of a diffractive optical element or, in the case of illumination lines, by forming a laser line with a movable laser or a movable mirror or mirror wheel. Video sensor 16 is offset relative illumination source 15 and is angularly inclined. As the example of two light beams 18a, 18b from different distances illustrates, the position of the picture imaged by optics 17 on video sensor 16 is distance-dependent: The further away the imaged object is (that is, the further to the right as seen in FIG. 6), the further down is the picture on video sensor 16 (that is, the further down as seen in FIG. 6).

As becomes apparent by also considering FIG. 3, the line of video sensor 16 extends in the down direction of FIG. 6. Video sensor 16 therefore has a shape which forms a line in the down direction for imaging different portions of plane 20. As can be seen in FIG. 6, the video sensor also has one or more light-receiving elements arranged in the up direction for triangulation. For this, several pixels or, for example, differential photodiodes can be arranged in the up direction. FIG. 6 further illustrates that, for triangulation, a sight angle of 180° is preferably provided.

Figure 7:
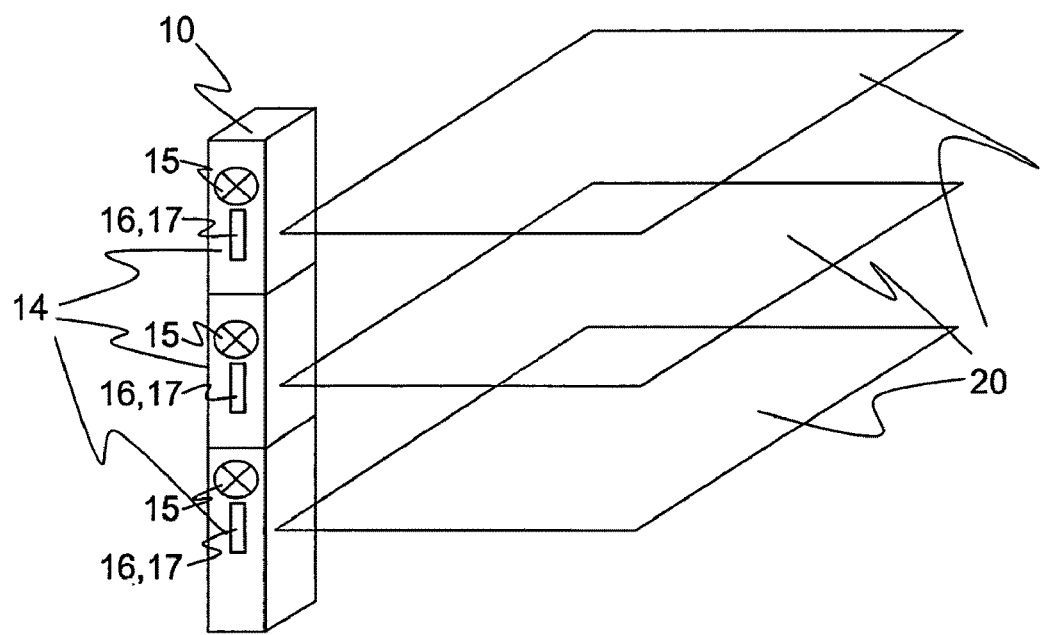
FIG. 7 three-dimensionally illustrates a multi-plane sensor that determines distances on the basis of elapsed light travel time.

As shown in FIG. 7, distances can alternatively be determined on the basis of the elapsed light travel time. This is different from the embodiment of the invention relating to triangulation because here video sensors 16 lie in planes 20 that are to be observed, and light sources 15 are arranged above, below or coplanar with the respective planes. As is true for triangulation, the elapsed travel time method for determining distances is known. The distance can either be determined on the basis of the time that elapses for an emitted light pulse to reach the light-receiving element or, in the alternative, by measuring the phase of intensity-modulated light. In the first alternative, the control unit (not shown in FIG. 7)

causes the emission of a light pulse from light source 15 and determines the elapsed time until the pulse is received by video sensor 16. From this, the distance can be determined on the basis of the speed of light, as is well known to those of ordinary skill in the art. According to the second alternative, light source 15 emits an intensity-modulated light of a known phase and determines distances from the phase shift received by the video sensor.

Figure 8:
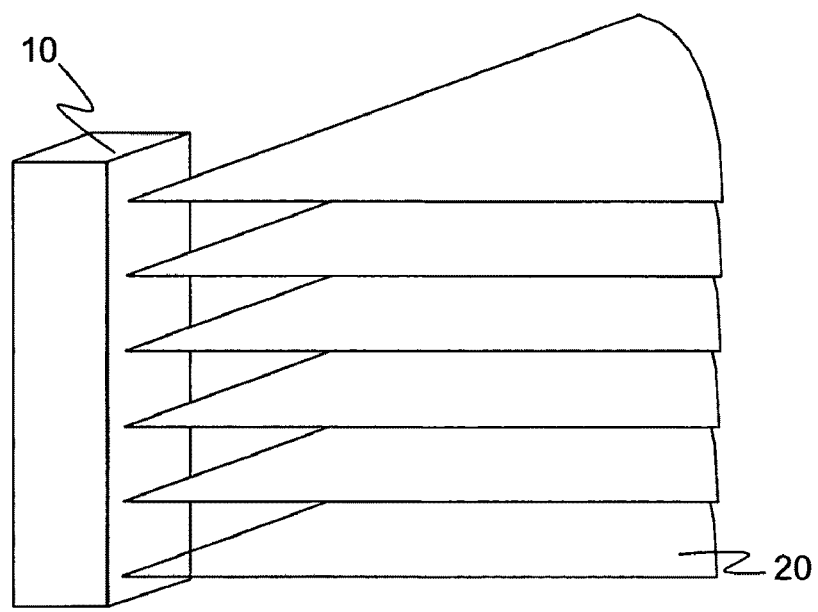
FIG. 8 three-dimensionally illustrates a multi-plane sensor with a maximum spacing for a monitored region.

The determination of distances opens further ways for using the present invention. FIG. 8 shows a multi-plane sensor which monitors the planes over only a predetermined minimum distance. This generates circular segments which then constitute the monitored plane 20. As is apparent, monitoring limits can be varied from plane to plane. In addition, the monitored regions 12 can be made dependent on the angle, which can also be varied from plane to plane. This permits use of virtually any monitoring geometry, such as for example a cone, a cylinder, a rectangular box, a cube, and the like. Since the angle of sight will normally be less than 360°, only a partial cone or partial cylinder, which correspond to the segments within the sight angle, and not a full cone or cylinder are obtained.

Figure 9:
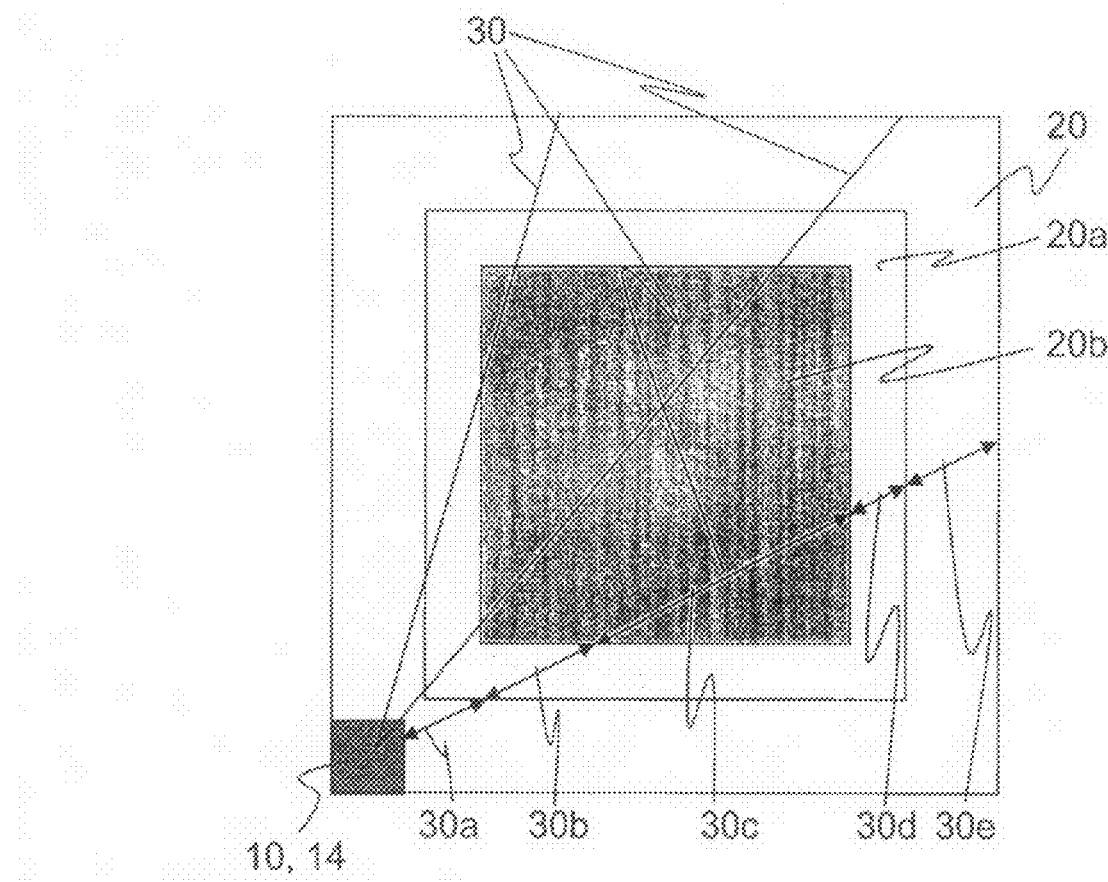
FIG. 9 is a plan view of a plane which shows a warning zone and a protected zone to assist the explanation of the distance conditions.

FIG. 9 illustrates that distance conditions not only determine the outer limits of the monitored region 12, but also permit differentiations within the space 12. FIG. 9 shows a surface sensor 14 with associated observed planes 20 in plan view. The illustrated plane 20 has a warning zone 20a and a protected zone 20b. This serves the purpose that multi-plane sensor 10 can accept an entry of an object into space 12 so long as it neither enters the warning zone 20a nor the protected zone 20b. In the event an object enters warning zone 20a, multi-plane sensor 10 reacts in a first escalation by, for example, generating a simple warning signal such as a tone or an alarm. Should the object enter protected zone 20b, the multi-plane sensor reacts by eliminating the source of danger, for example by deactivating a dangerous machine. Amongst others, such a two-step system reduces the down times of deactivated machines by giving operating personnel a timely warning prior to a possible shut-down.

To recognize warning zone 20a and protected zone 20b, sight lines 30 have distances 30a-e which correspond to different angles and that are established during a learning phase. In this manner, the multi-plane sensor knows at what distance an object is in the warning zone 20a and at what distance it is in the protected zone 20b.

The distance conditions also enable blocking or disregarding certain portions of the monitored region so that, for example, locations where an object such as a pallet or a measuring head is permitted to enter will not be identified as a breaching object entry. This can also involve a dynamic adjustment by making the distances time-dependent or dependent on previously recognized objects. In this manner, slow-moving objects or objects located remote from the workers can be identified as non-dangerous.

Figure 10A:
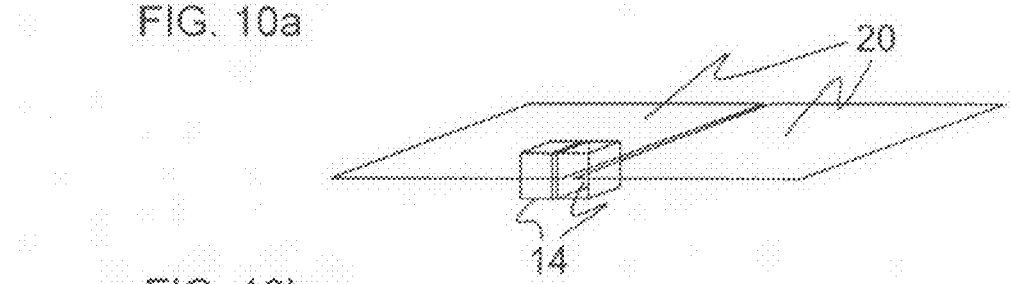
FIG. 10a illustrates an increased sight angle formed by two video sensors.
Figure 10B:
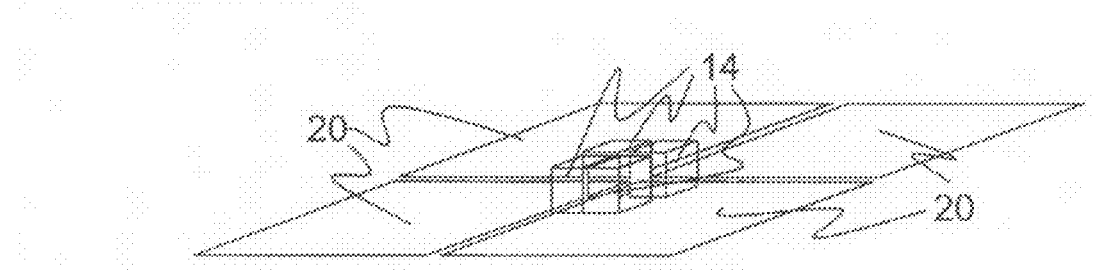
FIG. 10b illustrates an arrangement in which the sight angle is increased to 360° with the help of several video sensors.

FIGS. 10a and 10b show further embodiments of the invention. The surface sensors 14 have a sight angle of 90°. This angle is not mandatory. It is suitable for monitoring a cube-shaped monitored region 12, and a larger sight angle is technically obtainable only with greater effort. In accordance with this embodiment of the invention, several video sensors 16 or the associated surface sensor 14 are arranged next to each other so that their respective sight angles are added. By simultaneously using these sensors, a surface sensor 14 with an enlarged sight angle is obtained. FIG. 10a shows a surface sensor with an effective sight angle of 180° that is constructed of two surface sensors 14. FIG. 10b shows a surface sensor with an effective sight angle of 360° that is constructed of four surface sensors 14.

Figure 11A:
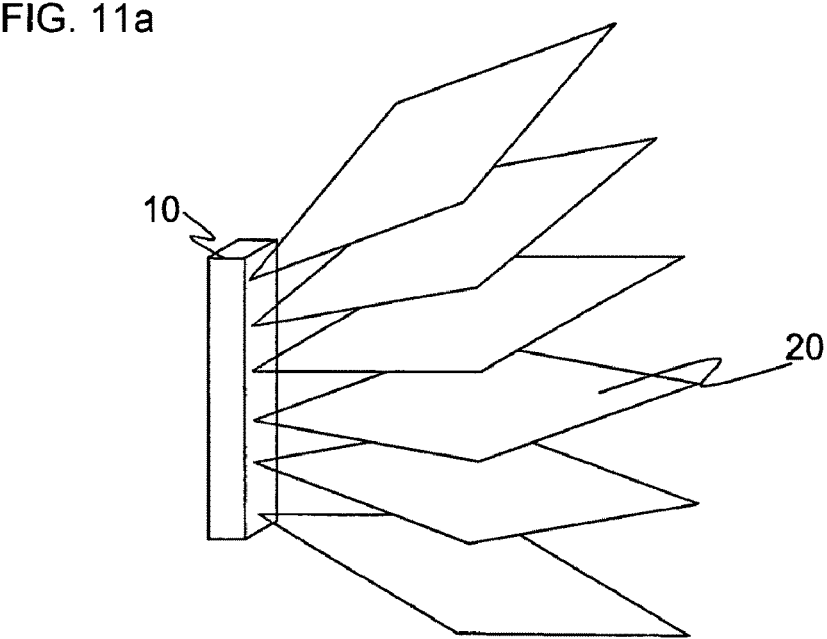
FIG. 11a illustrates a multi-plane sensor with fan-like arranged planes.

In the embodiments described so far, planes 20 are parallel to each other and surface sensors 14 lie on a common straight line. FIG. 11a illustrates an embodiment of the invention in which the surface sensors 14 are arranged on a common straight line. However, planes 20 diverge in a fan-like manner from each other. Here, the spacing between the planes depends on the distance to the multi-plane sensor 10. The safety classification, that is, a guaranteed maximum distance between planes 20, extends only over a certain distance as measured from multi-plane sensor 10. An advantage of this embodiment is that large obstacles located at a large distance can be recognized earlier, while the accuracy with which the object is recognized increases as the spacing to the multi-plane sensor decreases.

Figure 11B:
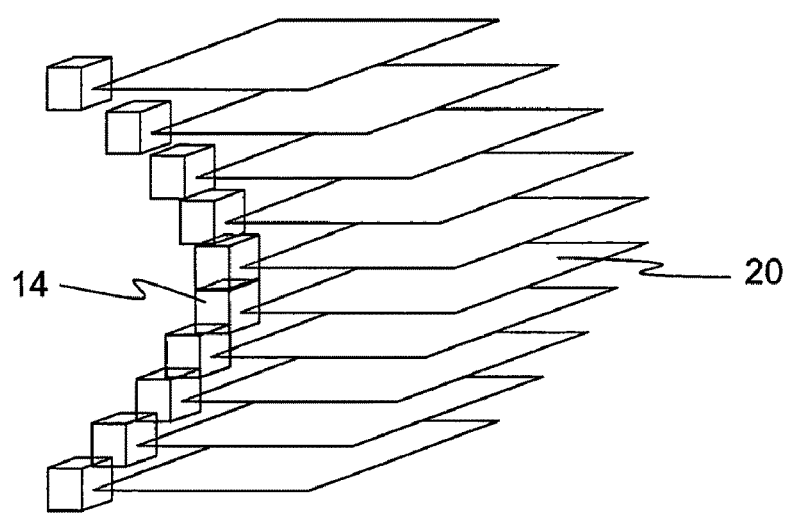
FIG. 11b illustrates a multi-plane sensor with the sensors arranged along a curve and in parallel planes.
Figure 11C:
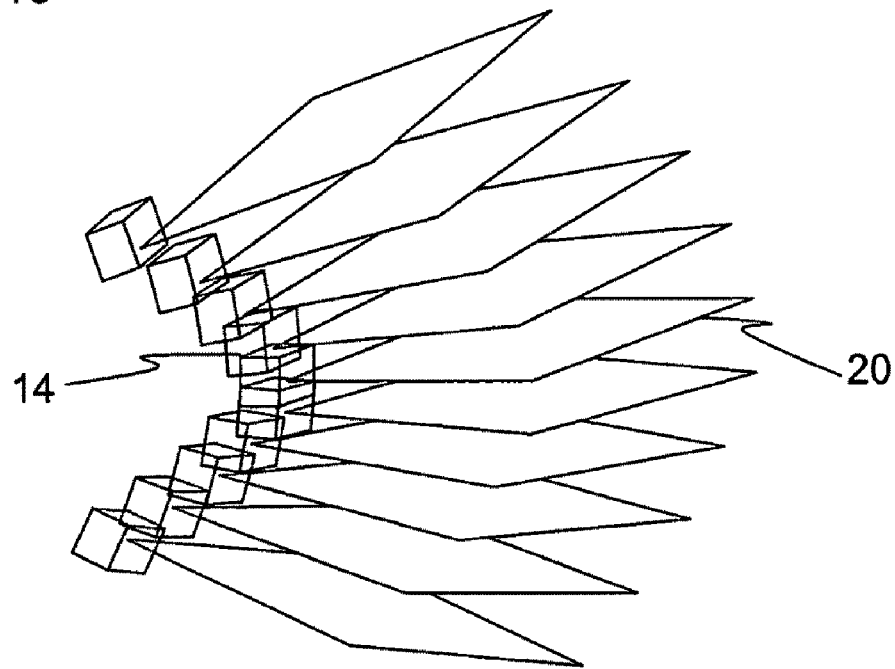
FIG. 11c illustrates a multi-plane sensor with video sensors arranged on a curve and with fan-like arranged planes.

FIG. 11b illustrates an embodiment of the present invention in which surface sensors 14 are not arranged along a straight line, but along a curve. This enables the multi-plane sensor 10 to adapt its shape to the curved surface. This can be used, for example, to protect a vehicle against collision ("electro-optical bumper"). FIG. 11c illustrates an arrangement in which surface sensors 14 lie on a curve and planes 20 diverge in a fan-like manner from each other. This is useful on vehicles for recognizing obstacles with large surfaces from relatively great distances.

Figure 12:
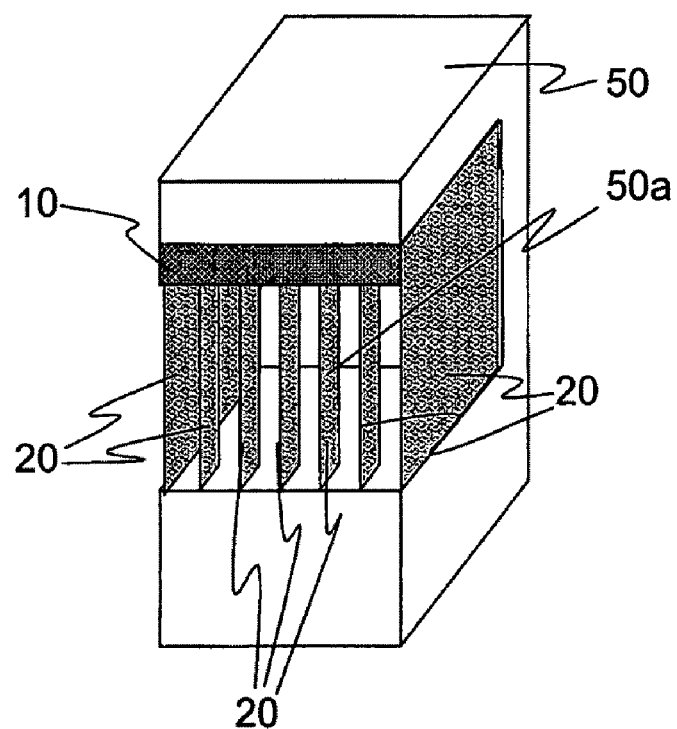
FIG. 12 is a plan view of a cage-like, rectangularly-shaped protected zone.

FIG. 12 illustrates an embodiment of the present invention in which a dangerous machine, such as a press brake 50, is protected. In the past, an inner portion 50a of press brake 50 was protected with several light grids, which were arranged at respective corners of inner space 50a. In accordance with the present invention, a multi-plane sensor 10 is provided which has planes 20 arranged so that the entire protected region resembles a cage. A significant advantage of this embodiment is that the entire inner space 50a is free of sensors and sensor parts. This arrangement can also be used for locating the position of machines and workpieces. It further permits changing the protected region in dependence on the position and/or movement of such machines, workpieces, or the like with the help of the above-discussed distance conditions. Monitoring can also occur when bending boxes, containers and the like which have sidewalls. Such a cage-like construction of the protected region can, of course, also be employed in spaces with different geometrical configurations.

Figure 13:
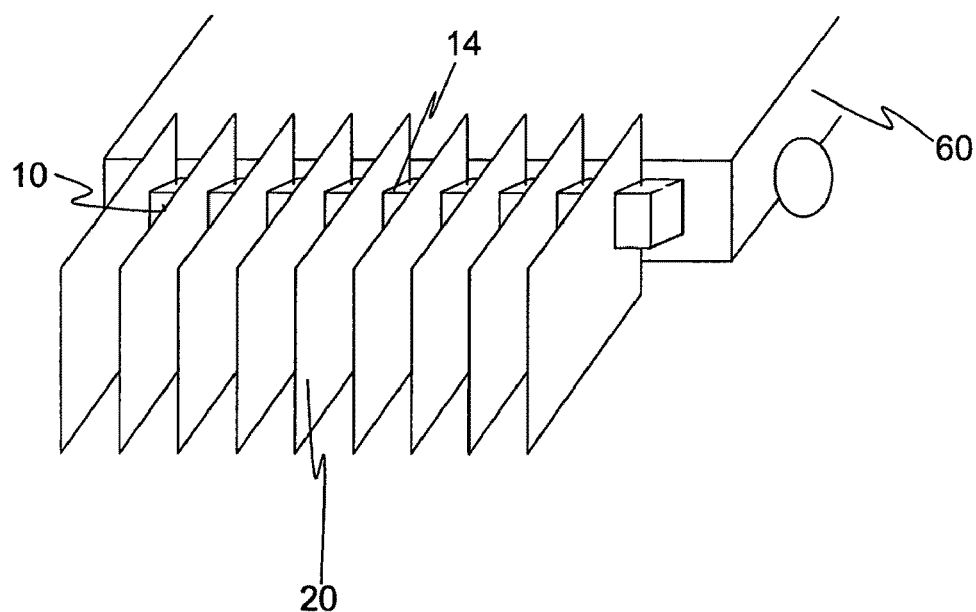
FIG. 13 shows a multi-plane sensor that is vertically mounted on a vehicle.

FIG. 13 shows an embodiment of the present invention with vertically arranged planes 20 as installed on a vehicle 60 (AGV, automated guided vehicle). For this, surface sensors 14 preferably have a sight angle of 180°. The resulting multi-plane sensor 10 therefore can be used as a substitute for a mechanical dumper and captures a three-dimensional space in front of the vehicle. With conventional sensors, critical situations can be encountered, such as for example when parts extend laterally into the travel path which can be sensed by a surface sensor, such as a laser scanner only in its scanned plane and not elsewhere.

Figure 14:
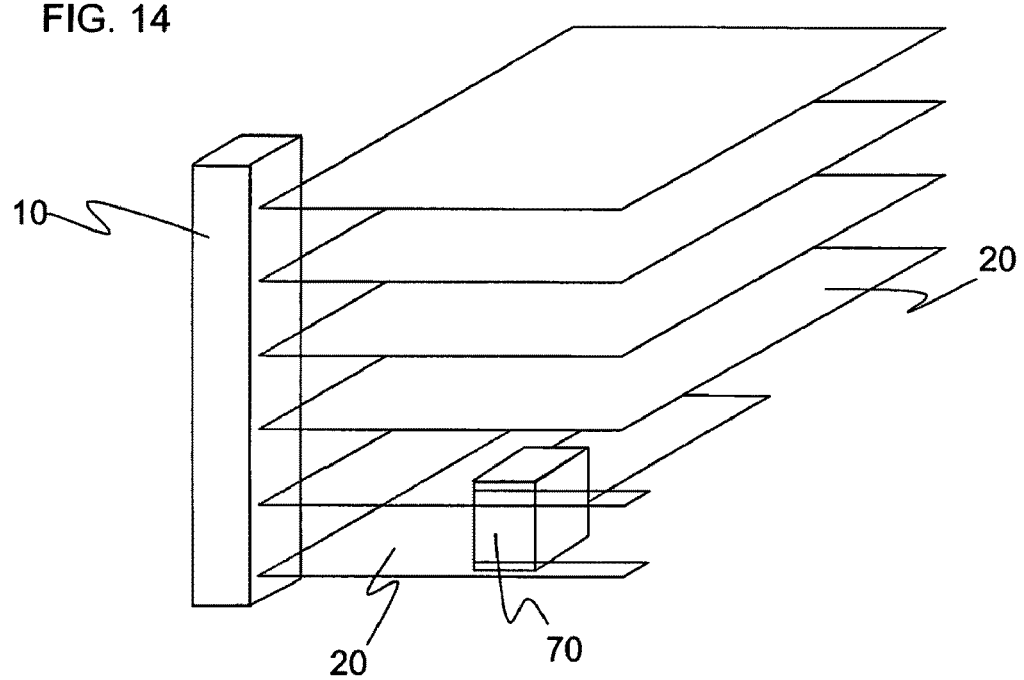
FIG. 14 illustrates the use of a multi-plane sensor for measuring objects.

FIG. 14 illustrates an embodiment of the present invention for measuring objects. The height of an object 7 can be determined on the basis of one or more planes 20 through which the object extends. Further dimensions can at least be partially determined from the distances. Conventionally, objects were measured by placing light grids in front of the sensor, which causes interferences.

To assure the proper functioning of a multi-plane sensor 10, cooperative boundaries for the monitored region 12 can be established. Reflective or contrasting patterns are particularly adapted for this. So long as their picture or distances are correctly recognized by video sensors 16, the sensors can be judged to be functional. Without such a cooperative boundary, it cannot be positively determined whether the monitored region is in fact unobstructed or the video sensor 16 is defective when the output of the multi-plane sensor 10 indicates that monitored region 12 is free of intruding objects.

What is claimed is:

1. An optoelectronic sensor for detecting an object in a three-dimensional monitored region comprising
   a plurality of video sensors having a multiplicity of light-receiving elements and configured to take a pixel picture of the monitored region, and
   a control unit adapted to identify an object from video data of the pixel picture, each video sensor including at least one pixel line formed by light-receiving elements, the video sensors being spaced from each other so that each video sensor monitors an associated plane of the monitored region,
   the video sensors being arranged so that the planes are one of non-overlapping and substantially parallel to each other and angularly diverging from each other in a fan-like manner beginning at the video sensors, the video sensors being further arranged so that any two planes are spaced from each other by a predetermined distance in at least a portion of the monitored region, the predetermined distance comprising 7-10 mm for the detection of fingers, 10-20 mm for the detection of extremities, and 30-80 mm for the detection of lower extremities of a human body.

2. A sensor according to claim 1 wherein the video sensors are arranged on one of a straight line and a curved line.

3. A sensor according to claim 1 including a light source for each video sensor.

4. A sensor according to claim 3 wherein the light source comprises one of a laser and an LED.

5. A sensor according to claim 3 wherein the light source comprises a light source for one of visible, infrared and ultraviolet light.

6. A sensor according to claim 1 wherein the video sensors are configured to generate a pixel picture that includes distance information.

7. A sensor according to claim 3 wherein the light source is configured to generate one of a structured light pattern and an illumination line, and wherein the video sensor is configured to determine distances by triangulation.

8. A sensor according to claim 7 wherein the video sensor includes a diffractive optical element positioned in the light emitted by the light source.

9. A sensor according to claim 3 wherein the light-receiving elements are adapted to determine distances on the basis of the elapsed light travel time.

10. A sensor according to claim 7 wherein the light sources emit light pulses and wherein the light-receiving elements determine the travel time of the pulses.

11. A sensor according to claim 7 wherein the light sources generate intensity-modulated light and wherein the light-receiving elements are adapted to determine a phase shift thereof.

12. A sensor according to claim 6 wherein the sensor is constructed to monitor a protected zone which is part of the monitored region, and wherein the control unit provides angle-dependent distance conditions for each plane and recognizes a detected object as being a prohibited object in the protected zone when distance conditions for the protected zone are met.

13. A sensor according to claim 12 wherein the sensor protects a warning zone which is part of the monitored region and includes the protected zone, and wherein the control unit provides angle-dependent distance conditions for each plane and recognizes an object as being in the warning zone when distance conditions for the warning zone are met.

14. A sensor according to claim 13 wherein the protected zone distance conditions and the warning zone distance conditions are the same for at least some of the planes and for at least one angular range.

15. A sensor according to claim 13 wherein at least one of the protected zone and the warning zone has the shape of a cube, a rectangular block, a partial cone, a partial cylinder and a correspondingly shaped cage.

16. A sensor according to claim 13 wherein the control unit generates a warning signal when an object is detected in the warning zone.

17. A sensor according to claim 1 wherein each video sensor has a sight angle of about 90°.

18. A sensor according to claim 1 including at least one additional video sensor associated with each of the plurality of video sensors and arranged so that the sight angles of associated video sensors are additive.

19. A sensor according to claim 1 wherein each video sensor includes one of a CD chip and a CMOS chip with a plurality of lines and is initially subjected to a learning phase during which the line or lines are selected that are to be used for monitoring the associated plane to thereby facilitate adjustments of the video sensor.

20. A sensor according to claim 1 wherein the light-receiving elements of each video sensor have a common optics.

21. A sensor according to claim 1 wherein groups of light-receiving elements of each video sensor include a micro optics, and wherein the video sensor and the micro optics together define a common module.

22. A sensor according to claim 21 including a common support carrier mounting a plurality of video sensors or a plurality of common modules.

23. A sensor according to claim 1 including a common energy supply for the video sensors and the light-receiving elements.

24. A video sensor according to claim 1 wherein the control unit is a common control unit for at least some of the video sensors.

25. A sensor according to claim 24 wherein the common control unit is configured to combine a plurality of object detections from at least some of the video sensors in different planes into a geometric object classification, and wherein the control unit is adapted to identify only predetermined object classifications as constituting danger.

26. A sensor according to claim 24 wherein the common control unit is adapted to combine positions of the objects relative to each other and changes thereof over time for identifying predetermined object positions or movements as constituting a danger.

27. A sensor according to claim 1 wherein the monitored region has a cooperative boundary, and wherein the control unit is configured to compare an image or a distance of the boundary with a reference picture or a reference distance, respectively, to check the functionality of the video sensor.

28. A sensor according to claim 1 wherein the control unit is adapted to generate a warning signal or a shutdown signal for a machine located in the monitored region when an object is detected in the protected zone or when a danger is recognized.

29. A sensor according to claim 1 adapted for installation on one of a mobile vehicle and a robot.

30. A sensor according to claim 1 configured to be used for measuring objects in the monitored region.

31. A method for detecting an object in a three-dimensional monitored region comprising
- providing a plurality of video sensors,
- arranging the video sensors in a plurality of planes extending into the monitored region which are one of non-overlapping and substantially parallel to each other,
- angularly diverging the planes from each other in a fan-like manner beginning at the video sensors so that any two planes are spaced from each other by a predetermined distance in at least a portion of the monitored region,
- selecting the predetermined distance so that it comprises 7-10 mm for the detection of fingers, 10-20 mm for the detection of extremities, and 30-80 mm for the detection of lower extremities of a human body,
- with the video sensors taking a pixel picture of the monitored region in the respective planes, and
- detecting the object by processing video data from the pixel picture.

* * * * *